United States Patent
Hillenbrand et al.

(10) Patent No.: US 6,435,218 B2
(45) Date of Patent: Aug. 20, 2002

(54) PIPE WITH CRACK STOPPER FEATURE, AND PROCESS OF PROTECTING A PIPE AGAINST PROPAGATION OF CRACKS

(75) Inventors: Hans-Georg Hillenbrand, Düsseldorf; Ingo Von Hagen, Krefeld; Gerd Junker, Ratingen; Gerhard Knauf, Duisburg; Johannes Arndt, Krefeld, all of (DE)

(73) Assignee: Mannesmann AG, Düsseldorf (DE)

(*) Notice: Subject to any disclaimer, the term of this patent is extended or adjusted under 35 U.S.C. 154(b) by 0 days.

(21) Appl. No.: 09/782,217

(22) Filed: Feb. 13, 2001

(30) Foreign Application Priority Data

Feb. 22, 2000 (DE) .......................... 100 09 305

(51) Int. Cl.$^7$ .................................. F16L 9/14
(52) U.S. Cl. .................... 138/172; 138/178; 138/DIG. 2
(58) Field of Search ................. 138/172, 176, 138/99, 141, DIG. 2, 178

(56) References Cited

U.S. PATENT DOCUMENTS

| | | | | |
|---|---|---|---|---|
| 2,924,546 A | * | 2/1960 | Shaw | 137/15.08 |
| 4,559,974 A | * | 12/1985 | Fawley | 138/172 |
| 4,676,276 A | * | 6/1987 | Fawley | 138/172 |
| 4,700,752 A | * | 10/1987 | Fawley | 138/172 |
| 5,236,018 A | * | 8/1993 | Kobayashi et al. | 138/109 |
| 5,632,307 A | * | 5/1997 | Fawley et al. | 138/97 |
| 6,276,401 B1 | * | 8/2001 | Wilson | 138/172 |

FOREIGN PATENT DOCUMENTS

| | | |
|---|---|---|
| DE | 30 32 176 A1 | 10/1981 |
| DE | 32 08 452 A1 | 1/1983 |
| DE | 31 35 966 C2 | 6/1986 |
| DE | 34 37 564 C2 | 2/1987 |
| WO | PCT/AU94/04996 | 5/1994 |

* cited by examiner

Primary Examiner—Patrick Brinson
(74) Attorney, Agent, or Firm—Henry M. Feiereisen

(57) ABSTRACT

A steel pipe, includes an outer corrosive-preventive protective sheath, which has a surface layer of plastic material, and a crack stopper zone extending over a section of the pipe. The crack stopper zone includes a bandage which is wrapped around the pipe section and made of high-strength fiber material imbedded in a compacted matrix of thermoplastic and thermosetting plastic. The bandage is comprised of a plurality of wound layers joined to one another via the matrix by welding or gluing.

34 Claims, 1 Drawing Sheet

PIPE WITH CRACK STOPPER FEATURE, AND PROCESS OF PROTECTING A PIPE AGAINST PROPAGATION OF CRACKS

CROSS-REFERENCES TO RELATED APPLICATIONS

This application claims the priority of German Patent Application Serial No. 100 09 305.1, filed Feb. 22, 2000, the subject matter of which is incorporated herein by reference.

BACKGROUND OF THE INVENTION

The present invention relates, in general, to the protection of a pipe section against propagation of cracks, and more particularly to a steel pipe of a type having an outer corrosion-preventive protective sheath, which includes a plastic surface layer, and a crack stopper zone, which extends over a section of the pipe. The present invention also relates to a process for making such a pipe.

Steel pipes or pipelines are often used for transport of fluid under comparably high pressure. Depending on the application, these pipes or pipelines are endangered by formation of cracks and fissures, when exposed to the stress at hand. Even though, this may be a rare event, the formation of cracks may have catastrophic results, e.g. when transporting gaseous fluids, such as transport of natural gas through pipelines of great diameters. Under certain conditions, such cracks may rapidly propagate over long distances of the pipeline. In order to keep the damage in check, proposals have been made to provide so-called crack stoppers along predetermined distances in the pipeline so as to limit crack propagation between two crack stoppers. Many proposals have been made in order to configure such crack stopper zones.

German Pat. No. DE 31 35 966 C2 describes a method of making multi-layer welded pipes, called helical seam steel pipes. Hereby, the individual layers are welded, separate from one another, to pipes. After nesting the pipes within one another, the pipes are then mechanically expanded to a preset outer diameter and joined together. Welding of the helical welding seam steel pipes is realized by providing a difference in diameter of the pipes that is suitable for nesting purposes. The pipes being utilized have helical welding seams of different helix angle so that the helical seams of the individual pipe layers intersect. The production of multi-layer pipes in this type is very complicated.

German Pat. No. DE 34 37 564 C2 describes a steel pipe for use as crack stopper for gas pipelines. The steel pipe includes several layers, typically two or three layers made of strips or sheet metal. In case of a two-layer configuration, the inner layer is significantly thicker than the outer layer and has on its outer surface a plurality of notches which extend at an angle between 35° and 70° in relation to the pipe axis so that any imaginary geometric axial line on the steel pipe passes at least through one of the notches. In case of a three-layer configuration, the center layer is formed with such notches or even continuous grooves. In any event, the obliquely oriented notches or grooves are neither directly accessible from the pipe inside or from the pipe outside. The entire wall thickness of this multi-layer crack stopper has a same thickness as the pipes of the respective pipeline. The individual layers of the crack stopper are welded together in circumferential direction along their end faces. Any crack in the pipeline, typically cracks running along the geometrical surface line, is ensured to reach one of the notches oriented obliquely to the crack migration so that the crack is deflected in circumferential direction and brought to a standstill.

German Pat. No. DE 32 08 452 A1 describes a crack stopper in the form of a cylindrical sleeve of an inner diameter which is greater than the outer diameter of the respective pipeline in which the sleeve is fitted. The outer peripheral surface of the sleeve includes at least one opening and is pushed along a portion of the pipeline and so centered with respect to the pipe axis that an annular space is formed between the inner surface of the sleeve and the outer surface of the pipeline. The annular space is sealed on its end faces, for example, by an outer strip. Subsequently, a curable filling material is pressed through the opening in the sleeve. Once cured, the filling material has still an elastic consistency. An example for use as filling material is urethane elastomer. The sleeve is typically made of a same material as the actual pipeline. The filling of the annular space with plastic is supposed to prevent a corrosion of the steel pipe in the area of the crack stopper. The fabrication of this type of crack stopper is rather complicated because it not only requires a centering of the sleeve but also a sealing of the openings at the end faces and a proper filling of the spaces with plastic. Furthermore, the thick-walled sleeve substantially increases the outer diameter and the weight.

German Pat. No. 30 32 176 A1 describes another type of crack stopper which includes a tubular body portion having two truncated cone shaped sections, which are sloped inwardly, and an intermediate section of reduced diameter at the outer surface. A cylindrical reinforcing member loosely embraces the cylindrical intermediate section and may be formed as a reinforcing sleeve. The reinforcing member may also be made of a strip or cable wrapped around the cylindrical section. To the outside, the crack stopper is surrounded over its entire length by a smooth cylindrical sheet metal shield, and the remaining space between the truncated cone shaped sections and this shield is filled with a filler material. This type of crack stopper is also very difficult to fabricate. Although the crack stopper does not result in a significant increase of the pipeline diameter, it is disadvantageous that the inner diameter of the cylindrical section of the crack stoppers is considerably smaller than the inner diameter of the remaining pipeline. This results not only in an undesired flow resistance but is also an obstacle when forcing a scraper through the pipeline.

It is also known to integrate by welding in a pipeline short pipes as crack stoppers, having a wall thickness which is thicker (e.g., twice the thickness) than the wall thickness of the remaining pipeline. The effectiveness of such crack stoppers is dependent not only on the calculated reduction of tensile stress in the pipe wall but also significantly on the fact that the thick-walled pipes are tough enough. In particular, when pipelines of high tensile steel such as X90 and X100 are involved, physical limitations are quickly reached that cannot be overcome. As thick-walled pipes normally are produced with a significantly smaller ductility than thin-walled large-sized pipes, thick-walled large-size pipes of such steels have typically a coarser texture and thus significantly poorer toughness than corresponding thin-walled large-size pipes for the actual pipeline. This type of crack stopper is therefore unsuitable for high-strength steels for use in pipelines.

International patent publication WO 94/29633 describes a protective plastic cover for a pipeline. The cover is made of half-shells configured as an outer bandage in the form of a sheet metal strap or plastic strap, or a hook-and-loop fastener strap. The material of the cover may be reinforced by fiber material. The protective cover is intended to prevent damage of the pipeline as a result of external forces, such as through impact of an excavator bucket, and to provide better visibility. The cover may have a mat-like configuration and can be wrapped on a pipeline in several layers and held together, for example, by straps or hook-and-loop fastener straps.

It would be desirable and advantageous to provide a pipe with improved crack stopping feature which obviates prior art shortcomings and which is easy to make and results in an insignificant weight increase, while yet is reliable in operation even for pipelines of high-strength steels.

SUMMARY OF THE INVENTION

According to one aspect, the present invention provides for a steel pipe, including an outer corrosion-preventive protective sheath, which includes a surface layer of plastic material, e.g. thermoplastics, and a crack stopper zone, which extends over a section of the pipe, whereby the crack stopper zone is formed by a bandage wrapped around the pipe and made of high-strength fiber material imbedded in a compacted matrix of thermoplastic or thermosetting plastic, with the bandage comprised of a plurality of wound layers joined together via the matrix material by welding or gluing.

The protective sheath may be made from a cured layer of epoxy resin of a thickness of 0.5 mm to 1 mm, or may have a multi-layer configuration comprised of a layer made of epoxy resin having a thickness of about 30 microns to 50 microns and applied directly onto the steel pipe, and an outer surface layer of thermoplastic material having a thickness of about 2 to 3 mm and applied around the epoxy resin layer. Examples of thermoplastics include polyethylene or polypropylene.

A suitable glue is a hot melt adhesive which is made of a copolymer that corresponds to the plastic of the surface layer, e.g. ethylene copolymer.

According to another feature of the present invention, the matrix should be cured when made on the basis of thermosetting plastic.

The fiber material should be long fibers or continuous fibers, i.e. fibers of any length that can be spun to embrace the entire pipe perimeter and suitable to absorb very high tensile forces. Of course, it is not necessary to provide uniform fiber material, but different individual materials may also be used, i.e. mixtures of fibers. Suitable examples of fiber mixtures are fiber composites that exhibit high tensile strength and may include carbon fibers, aramide fibers, and glass fibers.

According to another feature of the present invention, the crack stopper zone is formed by wrapping the bandage several times, whereby the plurality of wound single layers welded together via the matrix material and thus adhere firmly upon the pipe. A suitable number of layers depends on the conditions at hand, in particular on the level of the working pressure of the pipeline and its diameter, i.e. on the size of the tensile forces in circumferential direction to be absorbed in the event the pipe cracks. Hereby, it is suitable that the crack stopper firmly adheres to the pipe. In some cases, it may be advantageous to apply the bandage on the pipe under a certain pretension, as this ensures that the support action of the bandage is fully applied, regardless of the temperature and working pressure of the pipe.

Suitable examples as matrix material for use with the fiber material of the bandage include polyethylene and polypropylene. Of course, other thermoplastics or thermosetting plastics may certainly also be suitable. Although, it is principally possible to apply the bandage of the crack stopper zone directly onto the steel pipe surface, the fabrication is easier when applying the bandage onto the corrosion-preventive protective sheath. When using a thermoplastic surface layer as corrosion-preventive protective sheath, the matrix material of the bandage is so selected as to correspond to the material of the surface layer. Suitably, the matrix material of the bandage is welded with the thermoplastic surface layer of the corrosion-preventive protective sheath, so that already the first layer of the fiber material is under an effective tensile stress.

According to another feature of the present invention, the bandage should be wound with at least 10 layers, preferably at least 15 layers, and most preferred at least 20 layers. Of course, the precise configuration depends on the conditions at hand. In general, the bandage has a thickness of at least 5 mm and may typically reach the range of about 10 to 15 mm. The axial length of the crack stopper zone is suitably at least about half the diameter of the pipeline. Preferred is a length of the crack stopper zone of one to three times the diameter of the pipeline.

Another aspect of the present invention involves the fabrication of a pipe with a crack stopper zone in accordance with the present invention. A respective fabrication process according to the present invention includes the following steps:

a) A corrosion-preventive protective sheath of plastic, e.g. an epoxy resin coat or in multi-layer configuration with a thermoplastic surface layer, is initially applied onto a cleaned surface of a steel pipe.

b) Subsequently, a bandage is wrapped around the pipe in several layers, with the bandage made of high-strength fiber material of practically continuous fibers (i.e. normally spun fibers) and imbedded in a matrix of thermoplastic or thermosetting plastic. In case, the matrix is made of thermoplastic, the matrix is heated immediately before the wrapping step, to effect a fusion of individual layers through at least a partial melt-on of the matrix material. In case, the matrix is made of thermosetting plastic, the matrix is heated during and/or immediately after the wrapping step, to effect a curing.

c) Finally, the bandage is cooled down to ambient temperature.

For some applications, it may be suitable to permanently maintain the fiber material during wrapping under a tensile stress. In this case, the protective sheath, when based on thermosetting plastic, should already have cooled down and solidified, to prevent the fiber material from cutting into the surface layer of the protective sheath. Suitably, the thermoplastic surface layer of the protective sheath should be melted on superficially, i.e. only over a small portion of its thickness, immediately before or during application of the first wound layer in order to realize a fusion with the matrix material of the bandage and thereby effect a fusion between the matrix material of the bandage and the surface layer. A gas burner, hot-air radiator or infrared radiator may generate heat required for fusion or melt-on of the matrix material or the surface layer.

A subsequent melt-on of the surface layer may be omitted, when during wrapping with the fiber material the surface layer is still hot and thus adhesive. In this case, the fiber material should not be under pretension. The same is true, i.e. no pretension of the fiber material, when the matrix is made of thermosetting material.

When using glass fibers, care should be taken that no fibers are present in the bandage that are open toward the outside to prevent ingress of moisture along the fiber surface into the bandage. The outer surface of the bandage should thus be fully covered with plastic.

The inventive and novel pipe with crack stopper zone can be fabricated in a comparably simple manner and only slightly thickens the outer region of the pipe. The weight increase of the pipe is negligible and the inner diameter of the pipe is not affected at all. There is no need to employ circumferential welding devices for incorporating the crack stopper as special component in a pipe being used for laying. Rather, the crack stopper according to the present invention can be applied to a regular factory-manufactured pipe of common length. This pipe may be provided by the manufacturer with a corrosion-preventive protective sheath which remains unaffected by a subsequent application of the crack stopper and retains its intended anti-corrosion feature. As the protective sheath is suitably applied before application of the crack stopper, the anti-corrosion feature is not influenced by the geometry of the crack stopper. A special treatment may be required only when the corrosion-preventive protective sheath is applied later.

BRIEF DESCRIPTION OF THE DRAWING

Other features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
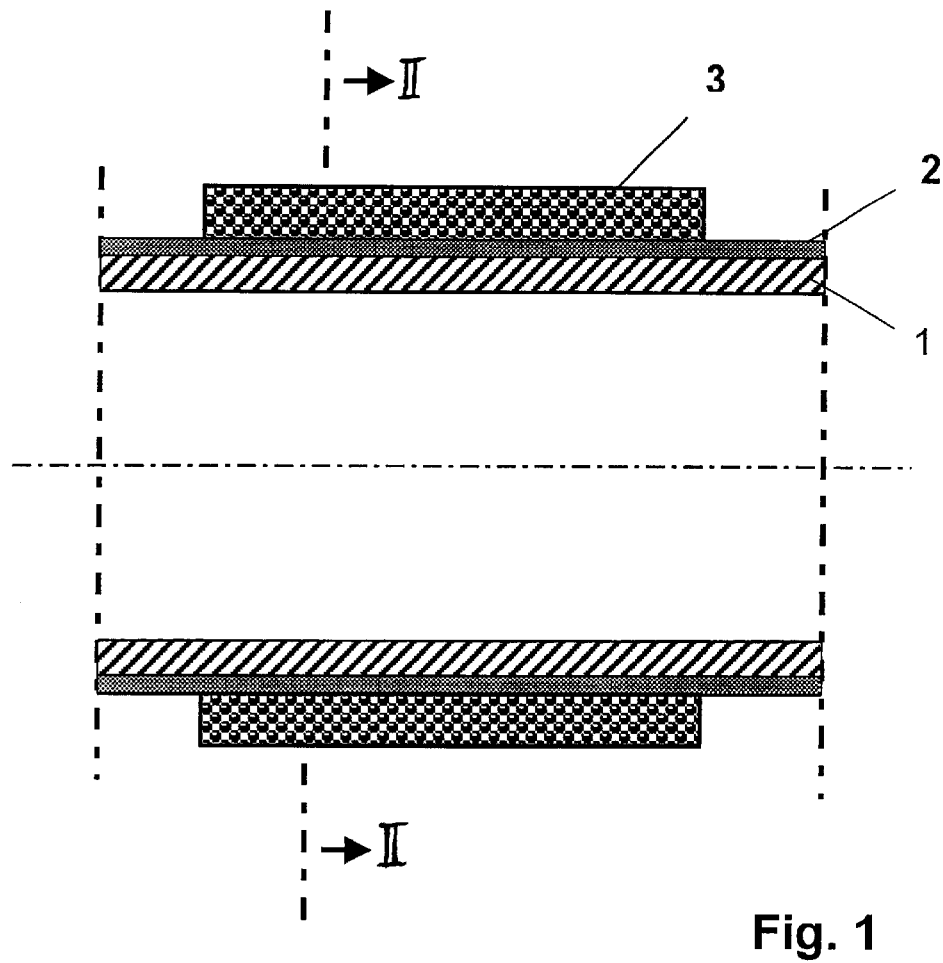
FIG. 1 is an axial longitudinal section of a pipe section provided with a crack stopper according to the present invention.

Throughout all the Figures, same or corresponding elements are generally indicated by same reference numerals.

Figure 2:
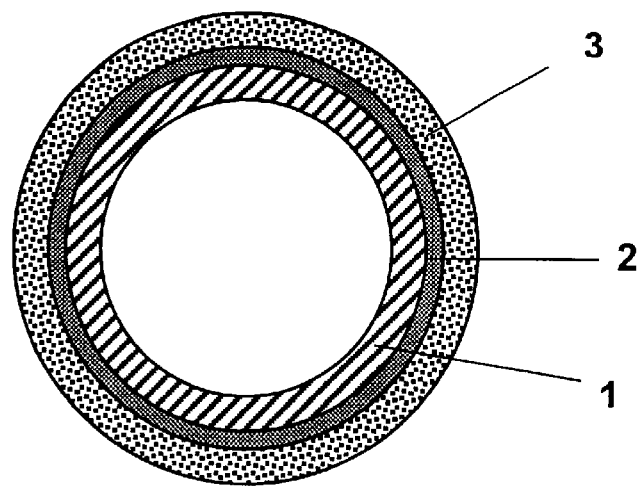
FIG. 2 is a cross sectional view taken along the line II—II in FIG. 1.

FIGS. 1 and 2 show an axial longitudinal section and a cross sectional view of a portion of a pipe 1 according to the present invention. The pipe 1 is shown only schematically and the representation involved here should not be interpreted to indicate actual size proportions. The illustrated pipe 1 is made of steel and includes an outer protective sheath 2 against corrosion. The protective sheath 2 may be composed, for example, of a primer of epoxy resin having a thickness of 50 microns, an adhesive film of ethylene copolymer having a thickness of 200 microns, and a surface layer of polyethylene having a thickness of 3 mm. Wrapped around the protective sheath 2 along an axial length that approximates a diameter of the pipe 1 is a bandage in the form a plurality of individual layers which are fused together to form a crack stopper zone 3. The bandage is produced by tightly wrapping a less than 1 mm thick band material which is produced from carbon fibers spun into threads and imbedded in a thermoplastic matrix of polyethylene. During wrapping, the band material and also the surface of the protective sheath 2 during application of the first wound layer, are melted on by a gas burner. In this way, the first wound layer is fused together with the surface layer of the protective sheath 2, and the subsequent additional individual wound layers are fused together.

According to a modification of the afore-described, it is also conceivable to wrap the steel pipe in several layers with a bandage of high-strength fiber material imbedded in a matrix of thermoplastic and thermosetting plastic. The number of layers of the bandage is selected to reliably withstand maximum tensile stress, when the pipe cracks during operation. Subsequently the corrosion-preventive protective plastic sheath is applied upon the bandage, and the bandage is allowed to cool to ambient temperature.

When applying, for example, twelve wound layers, the crack stopper zone 3 has an overall thickness of about 7 to 8 mm. This thickness of the bandage is sufficient to absorb the forces encountered when a crack occurs ion the pipe 1 and to terminate a further migration of the crack beyond the crack stopper zone 3.

While the invention has been illustrated and described as embodied in a pipe with crack stopper feature, and process of protecting a pipe against propagation of cracks, it is not intended to be limited to the details shown since various modifications and structural changes may be made without departing in any way from the spirit of the present invention.

What is claimed as new and desired to be protected by Letters Patent is set forth in the appended claims:

1. A steel pipe, comprising an outer corrosion-preventive protective sheath, which includes a surface layer of plastic material, and a crack stopper zone, which extends over a portion of a length of the pipe, said crack stopper zone formed by a bandage wrapped around the pipe and made of high-strength fiber material imbedded in a compacted matrix of a plastic selected from the group consisting of thermoplastic and thermosetting plastic, said bandage comprised of a plurality of wound layers joined to one another via the matrix by a process selected from the group consisting of welding and gluing.

2. The pipe of claim 1, wherein the surface layer is made of a thermoplastic material.

3. The pipe of claim 1, wherein the fiber material includes spun fibers selected from the group consisting of carbon fibers, aramide fibers, and glass fibers.

4. The pipe of claim 1, wherein the matrix is made of a material selected from the group consisting of polyethylene and polypropylene.

5. The pipe of claim 1, wherein the bandage is arranged on the outside onto the protective sheath.

6. The pipe of claim 5, wherein the matrix of the bandage and the surface layer of the protective sheath are welded together.

7. The pipe of claim 1, wherein the fiber material is under initial tensile stress.

8. The pipe of claim 1, wherein the crack stopper zone has an axial length which is at least 0.5×D, wherein D is a diameter of the pipe.

9. The pipe of claim 8, wherein the axial length of the crack stopper zone is in a range of 1×D to 3×D.

10. The pipe of claim 1, wherein the bandage has at least 10 wound layers.

11. The pipe of claim 1, wherein the bandage has at least 15 wound layers.

12. The pipe of claim 1, wherein the bandage has at least 20 wound layers.

13. The pipe of claim 1, wherein the bandage has a thickness of at least 5 mm.

14. The pipe of claim 1, wherein the bandage has a thickness of 10 mm to 15 mm.

15. A process of making a pipe with a crack stopper zone, comprising the steps of:

applying a corrosion-preventive protective plastic sheath upon a clean surface of a steel pipe;

wrapping the pipe in several layers with a band material made of high-strength fiber material imbedded in a matrix of a plastic selected from the group consisting of thermoplastic and thermosetting plastic, with the number of layers being so selected that the band material reliably withstands maximum tensile stress when the pipe cracks during operation; and cooling the band material to ambient temperature.

16. The process of claim 15, wherein the matrix is made of thermoplastic, and further comprising the step of heating the matrix immediately before the wrapping step to effect a fusion of individual layers through at least partial melt-on of the matrix.

17. The process of claim 15, wherein the matrix is made of thermosetting plastic, and further comprising the step of heating the matrix at least in one of the phases selected from the group consisting of during the wrapping step and immediately after the wrapping step, to effect a curing of the matrix.

18. The process of claim 15, wherein the protective sheath includes a thermoplastic surface layer, and further comprising the step of melting on the protective sheath at least in one of the phases selected from the group consisting of during wrapping of a first wound layer and immediately after wrapping of the first wound layer, to effect a fusion with the matrix.

19. The process of claim 18, wherein the thermoplastic surface layer is melted on only superficially over a minor portion of its thickness.

20. The process of claim 15, wherein the fiber material is so wrapped around the pipe as to maintain an initial tensile stress.

21. The process of claim 16, wherein the heating step for melt-on of the matrix of the band material is implemented by a device selected from the group consisting of gas burner, hot-air radiator, and infrared radiator.

22. The process of claim 18, wherein the matrix is made of thermosetting plastic, and further comprising the step of applying the band material on the thermoplastic surface layer of the protective sheath while the surface layer is still hot and freshly applied.

23. A process of making a pipe with a crack stopper zone, comprising the steps of:

wrapping a steel pipe in several layers with a bandage made of high-strength fiber material imbedded in a matrix of a plastic selected from the group consisting of thermoplastic and thermosetting plastic, with the number of layers being so selected that the bandage reliably withstands maximum tensile stress when the pipe cracks during operation;

applying a corrosion-preventive protective plastic sheath upon the bandage; and cooling the bandage to ambient temperature.

24. A crack stopper for attachment to a pipe section, comprising a bandage intended for wrapping the pipe section in several layers and made of high-strength fiber material imbedded in a compacted matrix of a plastic selected from the group consisting of thermoplastic and thermosetting plastic, wherein wound layers of the bandage are joined together by a process selected from the group consisting of welding and gluing, wherein the fiber material is under initial tensile stress.

25. The crack stopper of claim 24, wherein the fiber material includes spun fibers selected from the group consisting of carbon fibers, aramide fibers, and glass fibers.

26. The crack stopper of claim 24, wherein the matrix is made of a material selected from the group consisting of polyethylene and polypropylene.

27. A crack stopper for attachment to a pipe section, comprising a bandage intended for wrapping the pipe section in several layers and made of high-strength fiber material imbedded in a compacted matrix of a plastic selected from the group consisting of thermoplastic and thermosetting plastic, wherein wound layers of the bandage are joined together by a process selected from the group consisting of welding and gluing, wherein the bandage has an axial length which is at least 0.5×D, wherein D is a diameter of the pipe section.

28. The crack stopper of claim 27, wherein the axial length of the bandage is in a range of 1×D to 3×D.

29. A crack stopper for attachment to a pipe section, comprising a bandage intended for wrapping the pipe section in several layers and made of high-strength fiber material imbedded in a compacted matrix of a plastic selected from the group consisting of thermoplastic and thermosetting plastic, wherein wound layers of the bandage are joined together by a process selected from the group consisting of welding and gluing, wherein the bandage has a thickness of at least 5 mm.

30. The crack stopper of claim 24, wherein the bandage has a thickness of 10 mm to 15 mm.

31. A process of protecting a pipe against propagation of cracks, comprising the step of wrapping a pipe section in several layers with a bandage made of high-strength fiber material imbedded in a matrix of a plastic selected from the group consisting of thermoplastic and thermosetting plastic, wherein wound layers of the bandage are joined together by a process selected from the group consisting of welding and gluing, wherein the matrix is made of thermoplastic, and further comprising the step of heating the matrix immediately before the wrapping step to effect a fusion of individual layers through at least partial melt-on of the matrix.

32. The process of claim 31, wherein the matrix is made of thermosetting plastic, and further comprising the step of heating the matrix at least in one of the phases selected from the group consisting of during the wrapping step and immediately after the wrapping step, to effect a curing of the matrix.

33. A process of protecting a pipe against propagation of cracks, comprising the step of wrapping a pipe section in several layers with a bandage made of high-strength fiber material imbedded in a matrix of a plastic selected from the group consisting of thermoplastic and thermosetting plastic, wherein wound layers of the bandage are joined together by a process selected from the group consisting of welding and gluing, wherein the wrapping step is carried out with the fiber material at an initial tensile stress.

34. A process of protecting a pipe against propagation of cracks, comprising the step of wrapping a pipe section in several layers with a bandage made of high-strength fiber material imbedded in a matrix of a plastic selected from the group consisting of thermoplastic and thermosetting plastic, wherein wound layers of the bandage are joined together by a process selected from the group consisting of welding and gluing, wherein the wrapping step is carried out by winding the bandage at least ten times around the pipe section.

* * * * *